United States Patent [19]

Ogita

[11] 4,328,589

[45] May 4, 1982

[54] SYSTEM FOR INDICATING MULTIPATH INTERFERENCE IN RADIO RECEIVER

[75] Inventor: Minoru Ogita, Hamamatsu, Japan

[73] Assignee: Nippon Gakki Seizo Kabushiki Kaisha, Shizuoka, Japan

[21] Appl. No.: 104,524

[22] Filed: Dec. 17, 1979

Related U.S. Application Data

[63] Continuation-in-part of Ser. No. 860,416, Dec. 13, 1977, abandoned.

[30] Foreign Application Priority Data

Dec. 17, 1976 [JP] Japan ................................ 51-151559
Dec. 17, 1976 [JP] Japan ................................ 51-151560

[51] Int. Cl.³ .................... H04B 17/00; H03J 1/04
[52] U.S. Cl. ................................ 455/159; 455/226; 334/86
[58] Field of Search ............... 455/154, 156, 159, 226, 455/145; 334/36, 37, 86; 329/111; 179/1 GN; 116/241, 263

[56] References Cited

U.S. PATENT DOCUMENTS

| 3,732,498 | 5/1973 | Beckman | 455/159 |
| 3,753,120 | 8/1973 | Ohsawa | 455/159 |
| 3,881,155 | 4/1975 | Saikaishi | 455/226 |
| 3,896,386 | 7/1975 | Ohsawa | 455/159 |
| 3,987,401 | 10/1976 | Irving | 455/159 |

FOREIGN PATENT DOCUMENTS

48-40314  6/1973  Japan .

Primary Examiner—Tommy P. Chin
Attorney, Agent, or Firm—Jordan and Hamburg

[57] ABSTRACT

A radio receiver such as an FM stereophonic receiver includes a detector circuit connected to an intermediate frequency amplifying stage in the receiver for delivering a signal responsive to the signal strength and the degree of multipath interference, and a light emission section controlled in its average brightness and flicker in accordance with the detected signal so as to visually indicate the signal strength and the degree of multipath interference, respectively. The light emission section preferably is used also as another indicating device such as a dial pointer or a stereophonic indicator.

11 Claims, 4 Drawing Figures

SYSTEM FOR INDICATING MULTIPATH INTERFERENCE IN RADIO RECEIVER

BACKGROUND OF THE INVENTION

This application is a continuation-in-part of co-pending application Ser. No. 860,416 filed Dec. 13, 1977, now abandoned.

This invention relates to a system for indicating signal strength and multi-propagation-path interference, more particularly to a system for simultaneously indicating the signal strength and the degree of multipath interference in a radio receiver such as an FM stereophonic receiver.

In an FM stereophonic receiver or the like, multipath interference causes distortion of reproduced sounds and also deterioration of the signal-to-noise ratio and separation of stereophonic signals. Therefore, it is necessary to determine the direction and position of its antenna in such a manner as to minimize the degree of multipath interference. For this purpose, it is imperative to indicate the degree of multipath interference in the receiver.

A multipath interference degree indication system is known wherein the degree of multipath interference is indicated by a special meter. However, in this conventional system, it is difficult to instantaneously detect the degree of multipath interference actually applied to the receiver because the response speed of the pointer of the meter is inevitably limited. For this reason, the conventional system is often inconvenient for for installation and adjustment of the antenna. Furthermore, the provision of a meter, which is not used in the normal operation of the receiver, is undesirable from the standpoint of the cost thereof.

A system in which such a special meter is not used, and instead a signal level meter is switched to indicate the degree of multipath interferrence is also known in the art. With this system, it is true that the cost of the device can be reduced to some extent. However, the system still has the disadvantage that the operation of the device is rather troublesome and intricate because an operation of switching the meter is added. In addition, the fundamental problem as to indication by means of meters is not solved at all.

Also known in the art is a system in which the receiver is provided with terminals to be connected to an oscilloscope, and a Lissajous pattern formed by a multipath interference signal and a detector output signal is observed with the oscilloscope. In this system, it is possible to accurately detect the concrete contents of multipath interference, that is, a frequency or phase difference between the direct wave and the reflected wave or waves, for instance. However, since the oscilloscope is expensive, it is rare that ordinary users have such oscilloscopes. If the oscilloscope is built into the receiver, naturally the cost of the receiver is greatly increased. In addition, long experience is required for a person to be able to read waveforms on an oscilloscope. Therefore, the above-described system is not practical.

In addition, a system is known in which the detector output signal of the receiver and the multipath interference degree signal are selectively provided at the output terminals of the receiver so as to acoustically indicate the degree of multipath interference. However, this conventional system suffers from fundamental disadvantages, namely, as it is impossible to simultaneously hear the sound of the received radio signal and the sound of the multipath interference, it is impossible to accurately recognize or detect poor receiving conditions due to the multipath interference by referring to the correspondence between the degraded conditions such as distortion and defective separation in the received radio signal and the degree of multipath interference.

SUMMARY OF THE INVENTION

Accordingly, an object of this invention is to provide a system for simultaneously indicating signal strength and a degree of multipath interference in a radio receiver visually and without delay.

Another object of the invention is to minimize an increase in cost of the receiver by the provision of a system for indicating a degree of multipath interference therein.

A further object of the invention is to eliminate troublesome switching operations encountered in a conventional system for indicating the degree of multipath interference, and to allow the conditions of multipath interference to be detected while listening to reproduced radio signals.

The foregoing objects and other objects have been achieved, according to this invention, by the provision of a system for simultaneously indicating the degree of multipath interference and the signal strength in a receiver, which comprises detector means for simultaneously detecting multipath interference and signal strength, a light emission section in the receiver, and control means for controlling the flicker and brightness of the light emission section according to a detected signal output of the detector means so that the degree of multipath interference and signal strength are indicated by variations in flicker and brightness, respectively, of the light emission section.

The light emission section may be in the form of any indication device provided on a front panel of the receiver. Advantageously, the light emission section may be a lamp for illuminating a pointer in a dial indicating section for tuned frequency indication of the receiver, and in this case the flicker and brightness of the illumination of the pointer are varied according to the degree of multipath interference and signal strength, respectively.

The nature, utility, and principle of this invention will become more apparent from the following detailed description and the appended claims when read in conjunction with the accompanying drawings.

DETAILED DESCRIPTION OF THE INVENTION

Figure 1:
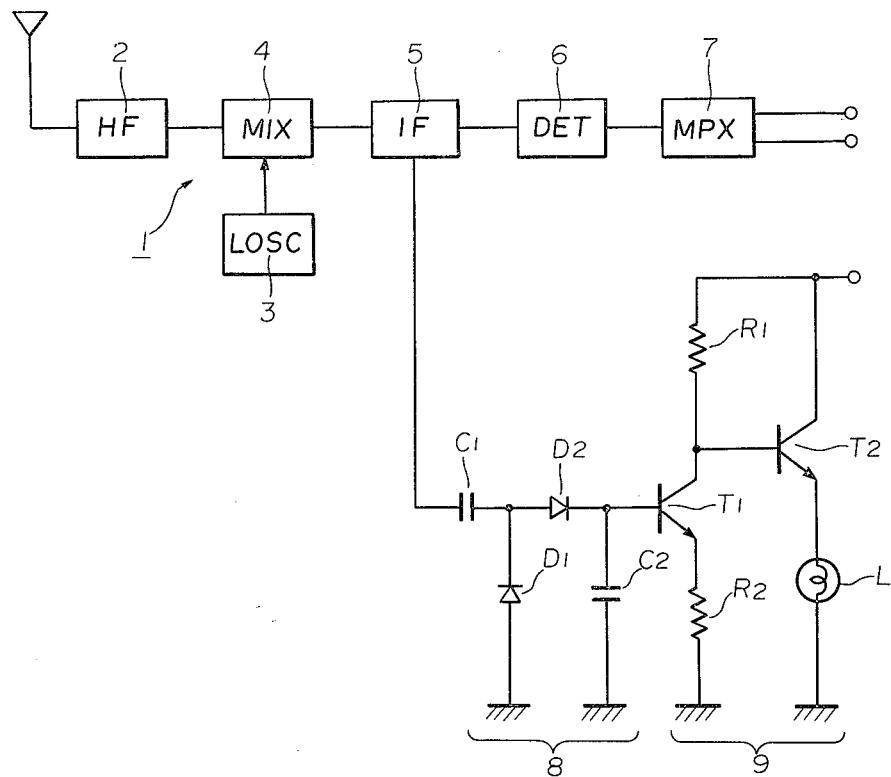
FIG. 1 is an electrical circuit diagram, partly as a block diagram, illustrating one example of an FM stereophonic receiver to which this invention is applied.

FIG. 1 shows an embodiment of this invention which is applied to an FM stereophonic receiver 1. The receiver includes a high-frequency amplifier stage 2, a local oscillator 3, a mixer stage 4, an intermediate-frequency amplifier stage 5, a detector stage 6, and a multiplex decoder 7. The detailed descriptions of these components of the receiver 1 will be omitted because they are similar to those of a conventional FM receiver.

A detector circuit 8 is connected as a means for detecting multipath interferences to the receiver, to the intermediate-frequency amplifier stage 5. More specifically, in the detector circuit 8 an intermediate frequency signal obtained from the intermediate frequency amplifier stage 5 is subjected to an AM (AC component) detection and a signal strength (DC component) detection. The detector circuit 8 is a voltage doubler or half-wave rectifying circuit comprising capacitors $C_1$ and $C_2$ and diodes $D_1$ and $D_2$. A control circuit 9 is connected to the detector circuit 8 and amplifies the signal subjected to the AM and signal strength detection, thereby to control a light emission section L comprising a lamp or light emitting diode. This control circuit 9 includes an inverting amplifier stage comprising a grounded emitter transistor $T_1$ and resistors $R_1$ and $R_2$, and a transistor $T_2$ connected in series with the light emission section L. The collector of the transistor $T_1$ in the amplifier stage is connected to the base of the transistor $T_2$.

Accordingly, a frequency modulation signal, that is, the aforementioned intermediate frequency signal is detected by the detector circuit 8, so that its DC component corresponds to the signal strength and its AC component corresponds to a degree of multipath interference. The voltage signal comprising these components is amplified by the amplifier stage so as to control the conduction of the transistor $T_2$, and therefore the average brightness and the flicker of the light emission section L are controlled in response to the signal strength and to the multipath interference degree, respectively. In other words, the intensity of the flicker of the light emission section L is varied with the degree of multipath interference.

Figure 2:
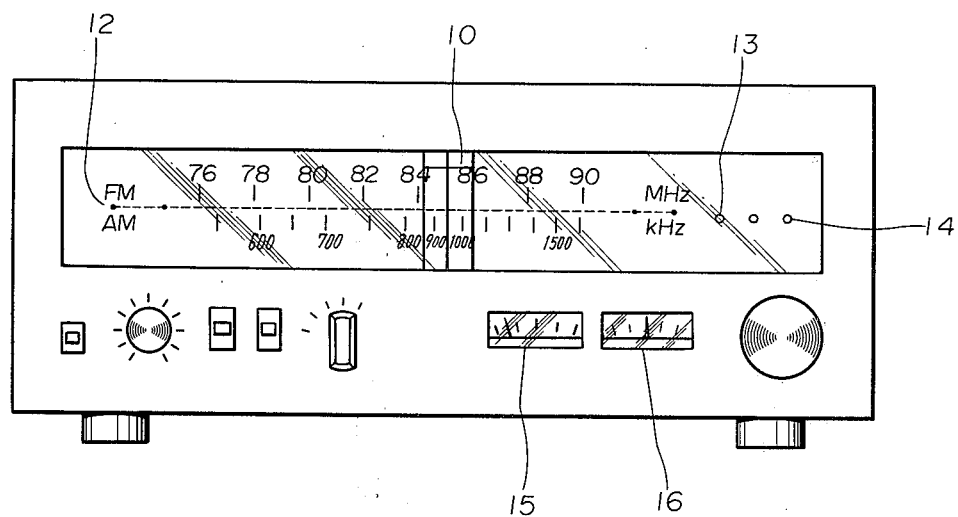
FIG. 2 is a front view showing the front panel of an FM stereophonic receiver to which the invention is applied.

All that is necessary for the light emission section L is to be visually seen during the operation of the receiver. Therefore, the light emission section L may be preferably provided on the front panel of the receiver; however, it may be replaced by a light emission section for display or illumination provided in a conventional receiver; in other words, the light emission section of the conventional receiver may be used as the light emission section L in question, as shown in FIG. 2. For instance, the light emission section L may be replaced by a dial plate illuminating lamp or a pointer illuminating lamp in a tuning dial indicating device 12, or a lamp or a light emitting diode for a stereophonic indicator 13, or a lamp or a light emitting diode for a power supply 14, or lamps for illuminating a signal meter 15 and a tuning meter 16.

Figure 3:
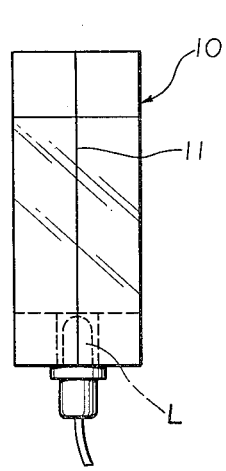
FIG. 3 is a front view showing a pointer of a receiver, for practicing this invention.
Figure 4:
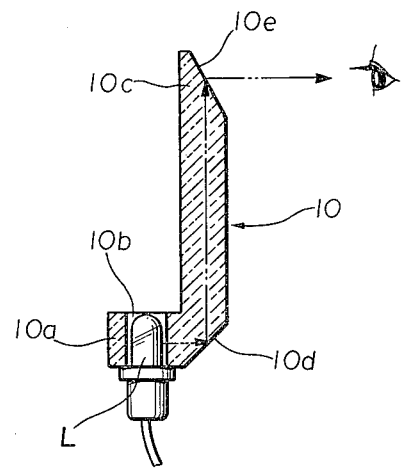
FIG. 4 is a side view illustrating the pointer shown in FIG. 3.

An example of the light emission section L which is replaced by the pointer illuminating lamp in the tuning dial indicating device 12 is further shown in FIGS. 3 and 4. A light emission element such as an illuminating lamp employed as the light emission section L is mounted in a through-hole 10b formed in the base 10a of an L-shaped pointer 10 of transparent or semi-transparent material such as for instance synthetic resin. The front side of the bent section of the pointer 10 has a lower cut substantially at 45° to form a reflecting surface 10d. The reflecting surface 10d thus formed is adapted to reflect light, which is allowed to enter the inside of the pointer from the light emission element L, toward the upper end portion 10c of the pointer. Furthermore, a 45 degree-inclined surface 10e is formed on the upper end portion 10c, so that the light reflected by the reflecting surface 10d and applied to the inclined surface 10e by advancing in the longitudinal direction of the pointer is radiated externally or forward of the receiver. Accordingly, the inclined surface 10e of the pointer is lit by the light from the light emission element L, and the flicker and brightness thereof are varied with the degree of multipath interference and signal strength, respectively. In order to light up the inclined surface 10e in this manner, it is, of course, advantageous to form the pointer 10 so that undesirable light refraction and scattering therein are minimized. In addition, it is also advantageous to coat the reflecting surface 10d with a reflecting material so that the light from the light emission element L is not passed through the reflecting surface 10d to the outside. In FIG. 3, reference numeral 11 is intended to designate the center line of the pointer 10.

As is apparent from the above description, in the indication system according to this invention the degree of multipath interference, together with the signal strength, are indicated by variations in flicker and brightness, respectively, of the light emission section provided on the receiver. Therefore, even ordinary customers or users who, in general, have no special or technical knowledge can visually detect the degree of multipath interference. Furthermore, in the indication system according to this invention, the indication of the degree of multipath interference and signal strength are achieved with a response speed much higher than that in the case where a meter is employed for the indication, and such an indication is carried out without a switching operation by the user and without eliminating reproduced sounds. Accordingly, it is possible to detect the conditions of multipath interference and signal strength instantaneously while referring to poor conditions such as distortion of reproduced sound. In addition, according to this invention, increase in the manufacturing cost of the device is relatively small.

In the embodiment shown in FIGS. 3 and 4, where the light emission section indicating the degree of multipath interference and signal strength is employed to illuminate the pointer of the dial indicating section for tuned frequency indication, variations in multipath interference and signal strength are indicated as variations in flicker and brightness, respectively, of the illumination pointer of the dial indicating section which is most closely related to the tuning operation. Therefore, the degree of multipath interference and signal strength can be visually detected simultaneously when the tuning operation is carried out.

In this embodiment of the invention, the intensity of light from the pointer will be greater when the receiver is detuned, and will have less intensity or be dark when the receiver is tuned. This effect results from the use of the inverter amplifier $T_1$ in FIG. 1, which directs a larger current to the indicator lamp when the received signal strength is low. This relationship between the pointer brightness and the receiver tuning condition also contributes to the ease of tuning, in the receiver in accordance with the invention. In other words, the amplifier is connected to the lamp to provide an output signal that decreases with increases in signal strength, in order to enhance the usefulness of the indicator in accordance with the invention.

While the invention has been disclosed with reference to a limited number of embodiments, it will be apparent that variations and modifications may be made therein, and it is intended in the following claims to cover each such variation as falls within the true spirit and scope of the invention.

What is claimed is:

1. A system for simultaneously indicating the degree of multipath interference and signal strength of a received signal in a radio receiver comprising:
   detector means connected to an intermediate frequency signal path in said receiver to extract therefrom a detected signal having a DC component with an amplitude depending on the strength of the intermediate frequency signal and an AC component depending on the degree of multipath interference;
   a light emitting section connected to be controlled in its brightness in dependence upon a control signal applied thereto; and
   control means coupled to said detector means for producing said control signal in dependence upon said detected signal, whereby the average brightness and flicker intensity of said light emitting section are controlled in accordance with said DC component and said AC component in said detected signal, respectively;
   said light emitting section also being employed in said receiver for indicating information concerning a function of said receiver other than said signal strength and multipath interference degree; and
   wherein said control means comprises means for inverting said detected signal for application to said light emitting section, whereby the portion of said light emitted by said light emitting section is inversely dependent upon the signal strength of said received signal.

2. The system of claim 1, wherein said detector means comprises a half-wave rectifying circuit.

3. The system of claim 1, wherein said control means comprises a circuit connected to vary a drive current in said light emitting section as a function of said detected signal.

4. The system of claim 1, wherein said light emitting section comprises a lamp mounted to illuminate a pointer in a dial indicating section, said dial indicating section indicating a tuning frequency in said receiver.

5. The system of claim 4, wherein said pointer is of a substantially transparent material, said lamp for illuminating said pointer being fixedly mounted at one end thereof whereby light from said lamp is at least partially introduced in said pointer to internally light said pointer.

6. The system of claim 5, wherein said pointer has a slant edge at the end thereof opposite to the end into which light was introduced.

7. The system of claim 1, wherein said detector means comprises a first capacitor serially connected to receive signals from said intermediate frequency signal path, first and second serially connected diodes poled in the same direction with the junction thereof being connected to the feed terminal of said first capacitor, one end of said serially connected diodes being connected to ground reference and the other end thereof constituting the output of said detector means, and a second capacitor connected between said output and ground reference.

8. The system of claim 1, wherein said control means comprises a grounded emitter transistor amplifier connected to the output of said detector means, said grounded emitter amplifier being connected to an emitter follower having a lamp connected in its emitter circuit.

9. The system of claim 1, wherein said light emitting section comprises a transparent tuning indicating pointer for said receiver, lamp means optically coupled to one end of said pointer for introducing light therein, the other end of said pointer being beveled to direct light from said lamp forwardly of said receiver, whereby said light is visible externally of said receiver.

10. The system of claim 9, wherein said one end of said tuning indicator is bent 90° to extend rearwardly in said receiver, said lamp extending into a hole adjacent said one end thereof, said indicator further having a face inclined at 45° to said lower end to reflect light from said one end toward the other end of said indicator.

11. The system of claim 1, wherein said receiver is a frequency modulation receiver.

* * * * *